United States Patent [19]

Hattori et al.

[11] Patent Number: 4,922,595
[45] Date of Patent: May 8, 1990

[54] TURRET HEAD UNIT

[75] Inventors: Takahiro Hattori, Nishio; Yoshinobu Kojima, Aichi; Masayuki Yamada, Nishio, all of Japan

[73] Assignee: Kira Machinery Co., Ltd., Aichi, Japan

[21] Appl. No.: 244,914

[22] Filed: Sep. 15, 1988

[51] Int. Cl.$^5$ .............................................. B23B 29/32
[52] U.S. Cl. ................................... 29/40; 29/48.5 A; 51/166 T; 408/35; 409/211
[58] Field of Search ................. 29/36, 40, 48.5 A, 39; 408/35; 409/201, 211; 51/166 T

[56] References Cited

U.S. PATENT DOCUMENTS

| | | | |
|---|---|---|---|
| 2,670,636 | 3/1954 | Burg | 408/35 X |
| 4,051,583 | 10/1977 | Kato et al. | 29/40 |
| 4,302,870 | 12/1981 | Schalles et al. | 29/40 |

Primary Examiner—Z. R. Bilinsky
Attorney, Agent, or Firm—Paul L. Sjoquist

[57] ABSTRACT

A turret head unit includes a turret head, a plurality of angularly disposed tool receiving spindles carried in the turret head, a spindle drive shaft rotatably mounted in the turret head, a clutch mounted on the spindle drive shaft and movable into and out of driving engagement with a tool receiving spindle in a working position, a turret rest rotatably supporting the turret head, indexing means including a main cam mounted in the turret rest and a disc-like pin wheel coaxially secured to the rear end of the turret head and adapted to engage the main cam so as to impart a rotational force to the turret head, clamp means including a first auxiliary cam mounted in the turret rest and a clamp member engaged by the first auxiliary cam for exerting a clamping force to the turret head in its indexed position as the first auxiliary cam rotates, and clutch operating means including a second auxiliary cam mounted in the turret rest and a cooperating member engaged by the second auxiliary cam for engaging and disengaging the clutch as the second auxiliary cam rotates.

9 Claims, 5 Drawing Sheets

TURRET HEAD UNIT

BACKGROUND OF THE INVENTION

1. Field of the Invention

The present invention relates to a turret head unit adapted to carry out drilling or like operations and having a plurality of angularly disposed tool receiving spindles mounted therein.

2. Description of the Prior Art

Conventionally, a turret head unit of this kind requires indexing of the turret head and clamping thereof, and has been usually provided with a hydraulic mechanism serving as means for performing these operations.

Such a conventional hydraulic mechanism, however, has been complicated in construction, with the result that the whole apparatus tends to become massive. Further, since the hydraulic mechanism for poor responsiveness, it has not satisfied the demands for reduction of machining time and for high speed operation of machine tools.

SUMMARY OF THE INVENTION

It is, accordingly, an object of the present invention to provide a turret head unit which eliminates the afore-noted disadvantages of the prior art.

It is another object of the present invention to provide a turret head unit of small construction which ensures positive indexing and clamping operations for the turret head.

It is a further object of the present invention to provide a turret head unit which satisfactorily meets the requirements for reduction of machining time and for high speed operation of machine tools.

According to the present invention, there is provided a turret head unit for presenting one of a plurality of tools to a working position. The turret head unit comprises a turret head, a plurality of angularly disposed tool receiving spindles carried in the turret head, a spindle drive shaft rotatably mounted in the turret head, a clutch mounted on the spindle drive shaft and movable into and out of driving engagement with a tool receiving spindle in the working position, a turret rest rotatably supporting the turret head, indexing means including a main cam mounted in the turret rest and a disc-like pin wheel coaxially secured to the rear end of the turret head and adapted to engage the main cam so as to impart a rotational force to the turret head, clamp means including a first auxiliary cam mounted in the turret rest and a clamp member engaged by the first auxiliary cam for exerting a clamping force to the turret head in its indexed position as the first auxiliary cam rotates, and clutch operating means including a second auxiliary cam mounted in the turret rest and a cooperating member engaged by the second auxiliary cam for engaging and disengaging the clutch as the second auxiliary cam rotates.

The invention will become more fully apparent from the claims and the description as it proceeds in connection with the drawings.

DETAILED DESCRIPTION OF THE PREFERRED EMBODIMENT

Figure 1:
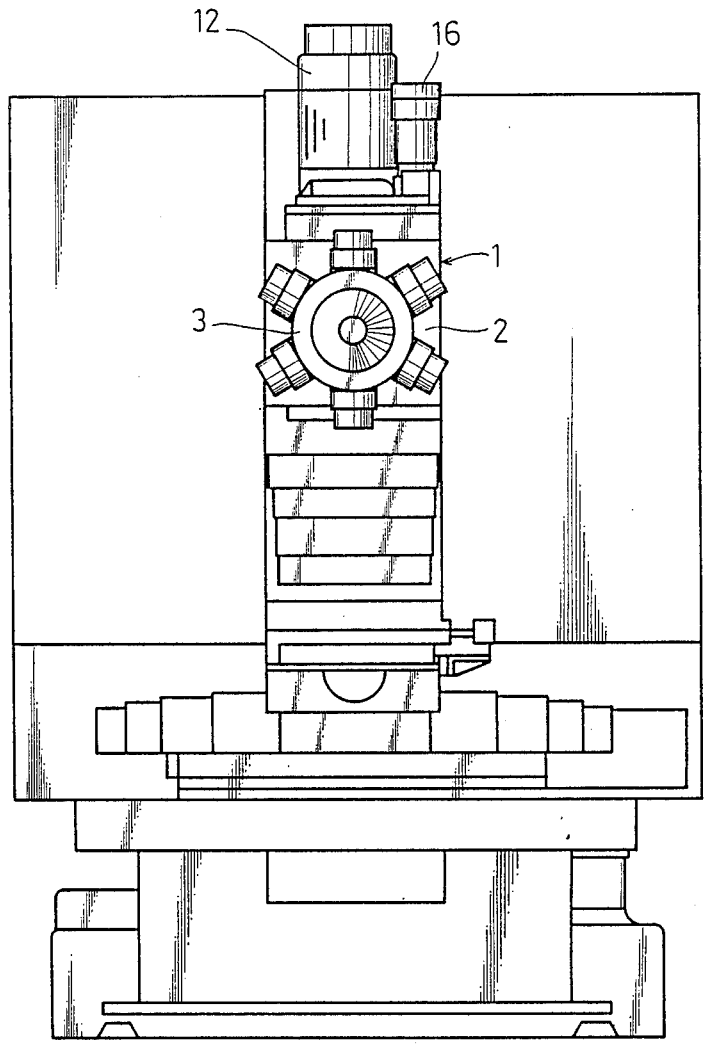
FIG. 1 is a front view of a turret drilling machine incorporating a turret head unit constructed in accordance with the present invention.

Referring now more specifically to the drawings, a turret head unit of the invention is illustrated generally at 1 in FIG. 1, and is mounted on a turret drilling machine. The turret head 1 includes a turret rest 2 serving also as a gear case, and a turret head 3 rotatably mounted on the front end of the turret rest 2.

Figure 2:
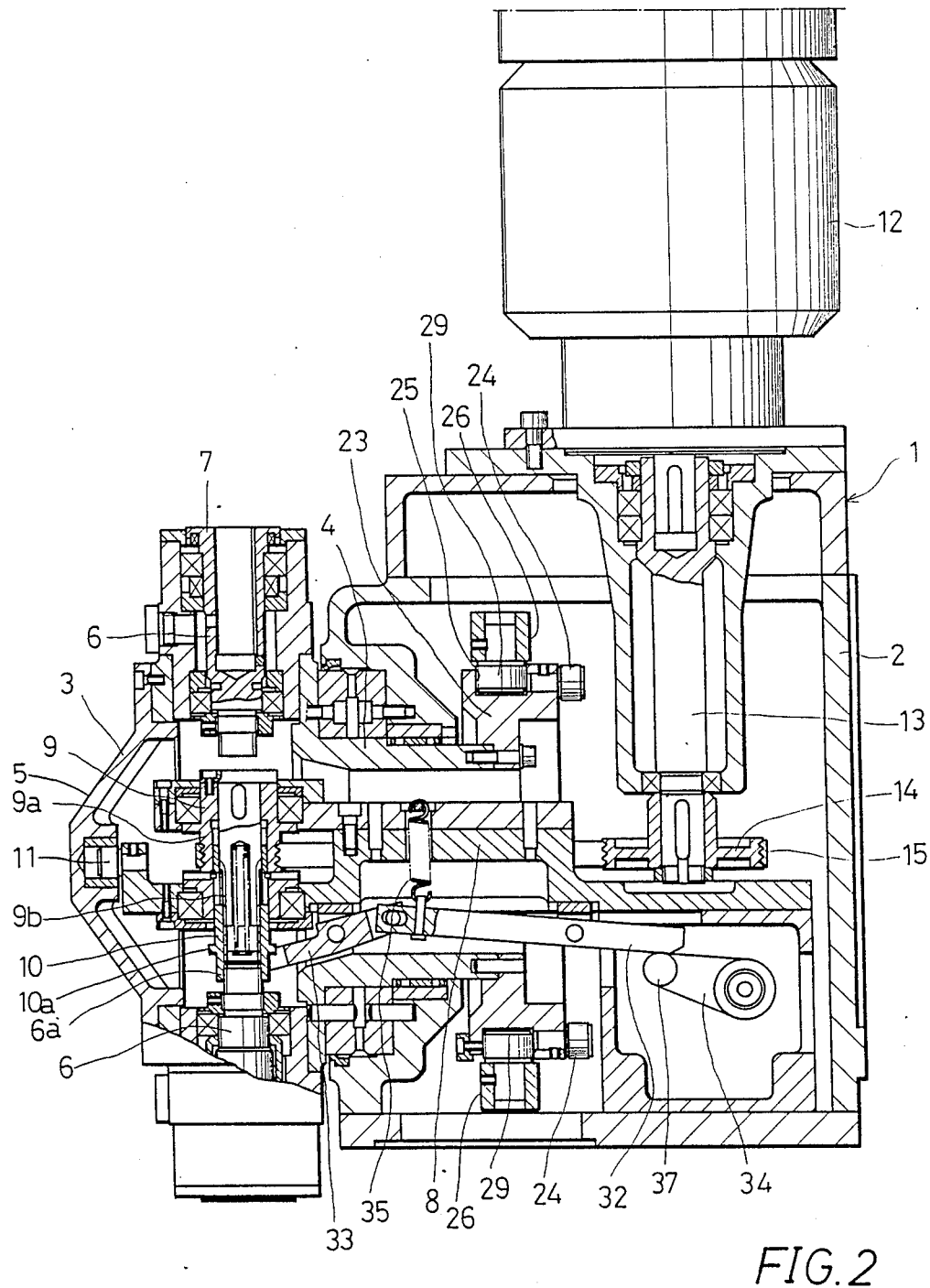
FIG. 2 is a side sectional view of the turret head unit of FIG. 1.

As shown in FIG. 2, the turret head 3 has a cylindrical portion 4 which is fitted into the turret rest 2, and a head portion 5 in which a plurality of tool receiving spindles 6 (only two are shown) are rotatably supported, being angularly disposed at equal intervals in a common plane. Each of the tool receiving spindles 6 is formed with a tool mounting portion 7.

A fixed plate 8 of H-shaped configuration in section is provided extending from the inside of the turret rest 2 to the inside of the turret head 3. The fixed plate 8 has a forward end portion located in the head portion 5 of the turret head 3 and is adapted to rotatably support a spindle drive shaft 9. The drive shaft 9 has a driven pulley portion 9a formed on the medial portion thereof, and a spline shaft 9b aligned in opposed relation to a spline shaft 6a of one of the tool receiving spindles 6 at a predetermined position. A clutch cylinder 10 is slidably fitted on the spline shaft 9b of the drive shaft 9 and is releasably engageable with the spline shaft 6a of the tool receiving spindle 6. The clutch cylinder 10 is operated by lever means which will be described later. The forward end of the fixed plate 8 extends into the turret head 3 and has a roller 11 which guides the turret head 3 to rotate.

A drive motor 12 is mounted on the top of the turret rest 2. The motor 12 has a motor shaft 13 extending into the turret rest 2 and is provided at the lower end thereof with a drive pulley 14 located in the same plane as the driven pulley portion 9a. A belt 15 is trained around the pulleys 9a and 14 and is disposed such that the longitudinal central axis thereof is substantially aligned with the axis of rotation of the turret head 3. Thus, rotation of the drive motor 12 causes the spindle drive shaft 9 to rotate through the belt 15, so that only one of the tool receiving spindles 6 is rotated which is engaged by the spindle drive shaft 9 through the clutch cylinder 10.

Figure 3:
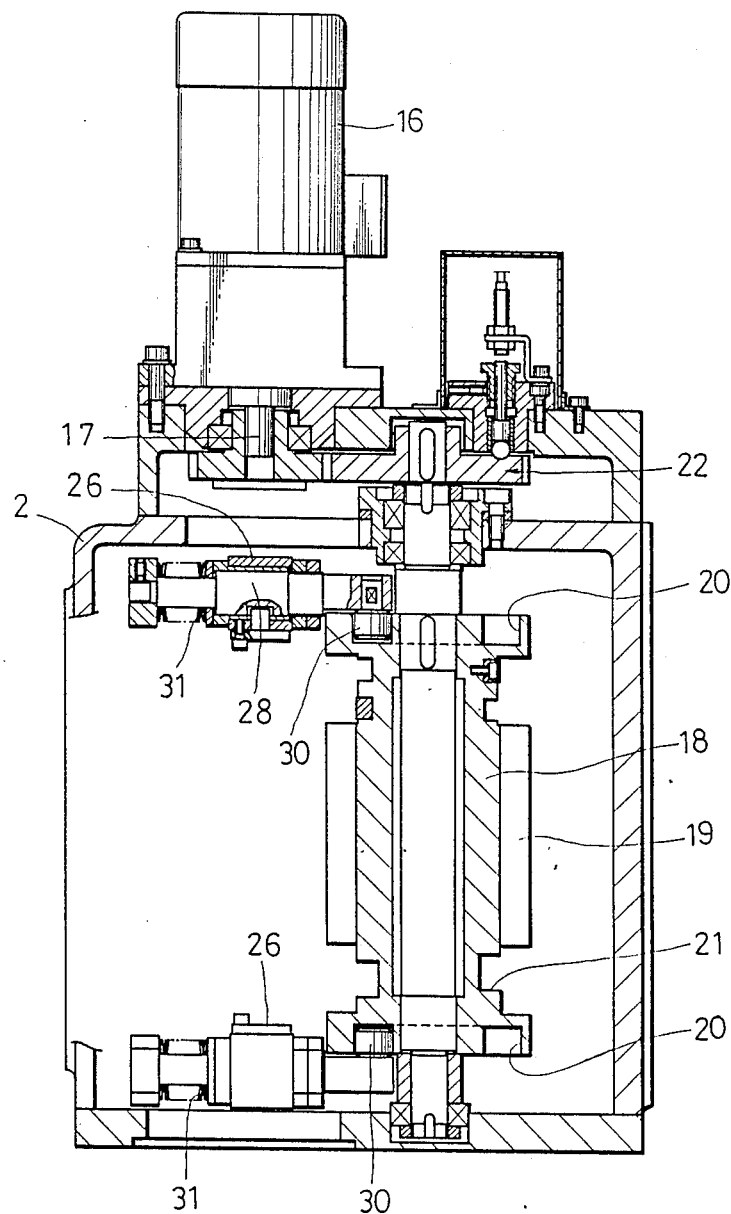
FIG. 3 is a side sectional view illustrating the relationship between the barrel cam and the clamp means.

As shown in FIG. 3, an indexing motor 16 is mounted on the turret rest 2 and has a motor shaft 17 extending into the turret rest 2. Disposed between the motor shaft 17 and the turret head 3 is indexing means for rotating and indexing the turret head 3.

Figure 4:
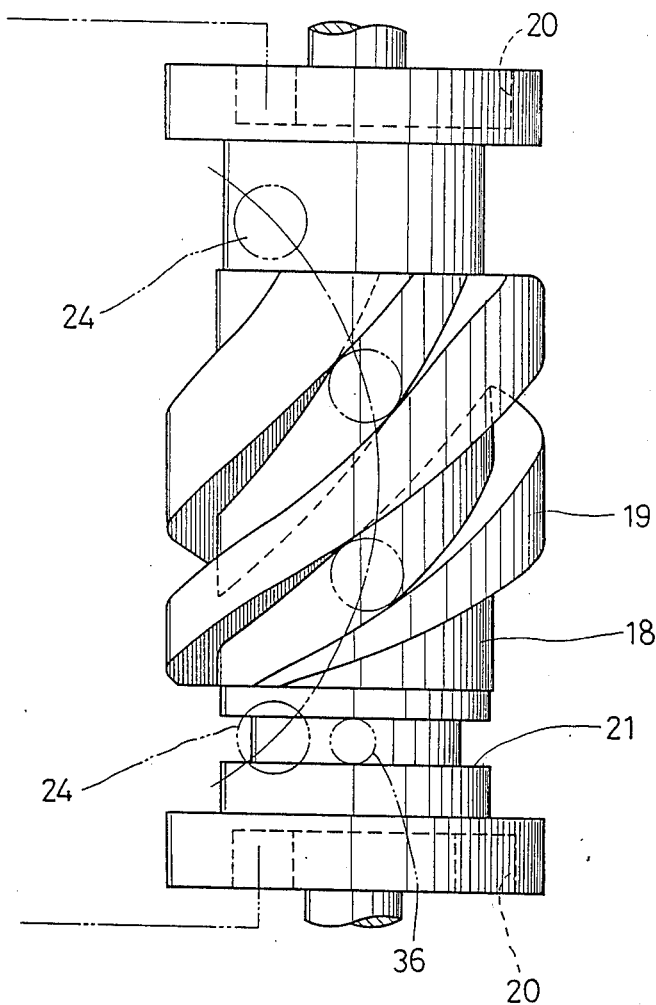
FIG. 4 is an enlarged sectional view of the barrel cam.

The indexing means includes a shaft-like barrel cam 18 vertically extending within and rotatably supported by the turret rest 2. As best shown in FIG. 4, the barrel cam 18 includes a main cam portion 19 of spiral groove configuration formed on the outer periphery of the shaft portion, first auxiliary cam portions 20 of grooved cam configuration formed on both end faces of the shaft portion, and a second auxiliary cam portion 21 of eccentric grooved cam configuration formed on the lower portion of the shaft portion. The barrel cam 18 is operatively associated with the motor shaft 17 of the indexing motor 16 through a group of gears 22 incorporated in the upper portion of the turret rest 2 (FIG. 2).

Figures 5, 6:
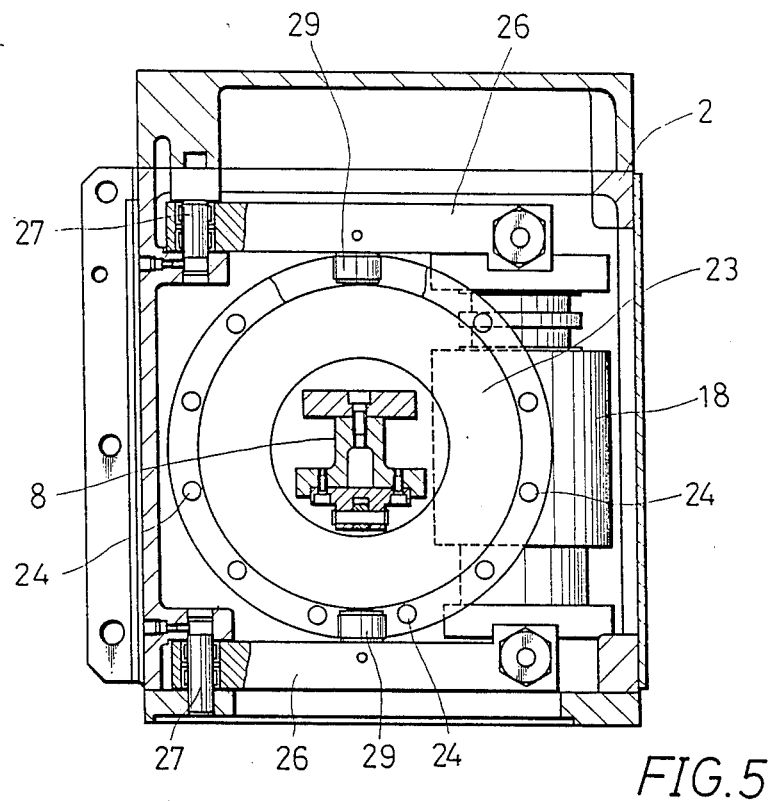
FIG. 5 is a front sectional view illustrating the relationship between the clamp means and the indexing means.
FIG. 6 is a plan sectional view illustrating the relationship between the barrel cam and the pivotal arm of the clutch operating means.

As shown in FIGS. 2 and 5, a disc-like pin wheel 23 is secured to the rear end of the cylindrical portion 4 of the turret head 3 located within the turret rest 2, and is disposed in opposing relationship with the main cam portion 19 of the barrel cam 18. The pin wheel 23 is provided on the rear end face thereof with a plurality of pins 24 disposed at equal intervals (12 pins disposed at twelve equal intervals in this embodiment), each pin 24 having a rotatable roller adapted to engage the main cam portion 19 of the barrel cam 18 (FIG. 4). The pin wheel 23 has an annular engaging groove 25 formed on the outer periphery thereof. Thus constructed, as the indexing motor 16 is rotated, the barrel cam 18 is rotated at a constant speed, causing the pin wheel 23 to rotate through the pins 24 which are brought one by one into engagement with the barrel cam 18, so that the turret head 3 is rotated to be indexed around the cylindrical portion 4 with respect to the turret rest 2.

The turret rest 2 further includes clamp means. As shown in FIG. 5, the clamp means includes a pair of horizontal arms 26 extending in opposing relationship with each other above and below the outer periphery of the pin wheel 23 and each having one end pivotally connected to a portion of the turret rest 2 through a suitable pin 27 and the other end adapted to support a connecting rod 28 associated with one of the first auxiliary cam portions 20 of the barrel cam 18. Each of the horizontal arms 26 has a rotatable clamp roller 29 projecting from the medial portion thereof and fitted in the engaging groove 25 of the pin wheel 23. A roller 30 is carried at right angles on one end of the connecting rod 28 and is engaged by the first auxiliary cam portion 20 (FIG. 3). A spring 31 is provided between the other end of the connecting rod 28 and the other end of the horizontal arm 26 and is adapted to normally urge the roller 30 against the first auxiliary cam portion 20 or to urge the connecting rod 28 in the direction away from the center of the barrel cam 18. Thus constructed, as the barrel cam 18 is rotated, the first auxiliary cam portions 20 cause the connecting rods 28 to pivot horizontally through the rollers 30. This pivotal movement of each of the connecting rods 28 causes the horizontal arm 26 to pivot in the same direction around the pin 27, so that, during the pivotal movement, the clamp roller 29 of the horizontal arm 26 is pressed onto a side wall of the engaging groove 25 of the pin wheel 23 and released from the engagement. Thus, the turret head 3 is clamped on and unclamped from the turret rest 2 through the horizontal arms 26.

In the turret rest 2, clutch operating means is disposed substantially at right angles to the clamp means. As shown in FIGS. 2 and 6, the clutch operating means includes a first operating lever 32, a second operating lever 33, and a pivotal arm 34. The first operating lever 32 is pivotally supported at the medial portion thereof along the fixed plate 8 and has one end urged toward the fixed plate 8 by a spring 35 (FIG. 2). The second operating lever 33 is pivotally supported substantially at the medial portion thereof and has one end engaged with a flange 10a of the clutch cylinder 10 and the other end associated with the one end of the first operating lever 32 in a slant manner through a slot and a pin loosely fitted in the slot. The pivotal arm 34 is of forked configuration and is pivotally supported in the turret rest 2. A roller 36 is mounted to one arm portion of the pivotal arm 34 and is fitted in the second auxiliary cam portion 21 of the barrel cam 18. Another roller 37 is mounted on the other arm portion of the pivotal arm 34 and is in contact with a slant surface formed at the other end of the first operating lever 32. Thus constructed, as the barrel cam 18 is rotated, the second auxiliary cam portion 21 causes the pivotal arm 34 to pivot through the roller 36 and consequently, the other arm portion of the pivotal arm 34 and the roller 37 are also provided, so that the first operating lever 32 and the second operating lever 33 are pivoted to slidingly move the clutch cylinder 10. This establishes a driving connection between the spindle drive shaft 9 and the tool receiving spindle 6.

When it is desired to rotate and index the turret head 3 in the above described arrangement, the indexing motor 16 is driven to rotate the barrel cam 18 at a constant speed through the group of gears 22. As this occurs, the second auxiliary cam portion 21 causes the pivotal arm 34 to pivot through the roller 36 on the one arm portion thereof, and consequently, the other arm portion of the pivotal arm 34 and the roller 37 are also pivoted in the same direction, so that the one end of the first operating lever 32 is moved downward (as viewed in FIG. 2), and consequently, the one end of the second operating lever 33 is pivoted upward to slidingly move the clutch cylinder 10 in the same direction. Therefore, rotational transmission between the drive shaft 9 and the tool receiving spindle 6 is cut off. The cam face of the second auxiliary cam portion 21 is formed in such a shape as to hold the condition thereafter.

Simultaneously with the above operation, the first auxiliary cam portions 20 cause the connecting rods 28 to pivot horizontally rearwardly through the rollers 30, and the clamp rollers 29 of the horizontal arms 26 are released from its pressed engagement with the engaging groove 25 of the pin wheel 23 to unclamp the pin wheel 23. The cam face of the first auxiliary cam portions 20 is formed in such a shape as to hold the condition thereafter.

Further, simultaneously with the above conditions, as the barrel cam 18 is rotated, the pins 24 of the pin wheel 23 are brought in engagement one by one with the main cam portion 19 of the barrel cam 18, which engagement causes the pin wheel 23 to rotate. Therefore, the turret head 3 secured to the pin wheel 23 is rotated to be indexed around the cylindrical portion 4 with respect to the turret rest 2.

When the turret head 3 has been rotated and indexed to a predetermined position as described above, the indexing motor 16 is stopped according to an appropriate indexing completion command. Thereupon, the first auxiliary cam portions 20 cause the connecting rods 28 to pivot horizontally forwardly through the rollers 30, and the clamp rollers 29 of the horizontal arms 26 are pressed in engagement with the engaging groove 25 of the pin wheel 23, thereby holding the pin wheel 23 in its clamped position. The cam face of each of the first auxiliary cam portions 20 is formed in such a shape as to hold the condition.

Furthermore, simultaneously with the above operation, the second auxiliary cam portion 21 causes the pivotal arm 34 to pivot in a direction opposite to the one described above through the roller 36. As this occurs, the other arm portion of the pivotal arm 34 and the roller 37 are pivoted in the same direction, so that the one end of the first operating lever 33 is moved upward (as viewed in FIG. 2) by the spring 35 and consequently, the one end of the second operating lever 33 is pivoted downward to slidingly move the clutch cylinder 10 in the same direction. Thus, connection between the drive shaft 9 and the tool receiving spindle 6 is completed to permit rotational transmission therebetween. The cam face of the second auxiliary cam portion 21 is formed in such a shape as to hold the condition.

Then, as the drive motor 12 is rotated, the tool receiving spindle 6 is rotated to perform a desired machining operation.

From the foregoing detailed description of the present invention, it can be appreciated that both of indexing and clamping operations for the turret head can be accomplished by the operation of the barrel cam driven by the indexing motor, which assures positive indexing and clamping of the turret head. Thus, it becomes possible to satisfactorily meet the requirements for reduction of machining time and for high speed operation of machine tools as well as to make the apparatus compact.

While the invention has been described with reference to a preferred embodiment thereof, it is to be understood that modifications or variations may be easily made without departing from the scope of the present invention which is defined by the appended claims.

What is claimed is:

1. A turret head unit for presenting one of a plurality of tools to a working position, comprising:
    a turret head having front and rear ends;
    a plurality of angularly disposed tool receiving spindles carried in said turret head;
    a spindle drive shaft rotatably mounted in said turret head;
    a clutch mounted on said spindle drive shaft and movable into and out of driving engagement with a tool receiving spindle in the working position;
    a turret rest rotatably supporting said turret head;
    indexing means including a main cam mounted in said turret rest and a disc-like pin wheel coaxially secured to the rear end of said turret head and adapted to engage said main cam so as to impart a rotational force to said turret head;
    clamp means including a first auxiliary cam mounted in said turret rest and a clamp member engaged by said first auxiliary cam for exerting a clamping force to said turret head in its indexed position as said first auxiliary cam rotates;
    clutch operating means including a second auxiliary cam mounted in said turret rest and a cooperating member engaged by said second auxiliary cam for engaging and disengaging said clutch as said second auxiliary cam rotates; and
    an indexing motor rotatably coupled to a barrel cam, said barrel cam mounted in said turret rest and being formed integrally with said main cam, said first auxiliary cam and said second auxiliary cam.

2. The turret head unit as defined in claim 1 wherein said main cam comprises a sprial groove formed on an outer periphery of said barrel cam.

3. The turret head unit as defined in claim 1 wherein said first auxiliary cam is formed on one end of said barrel cam and said second auxiliary cam is formed on the other end of said barrel cam.

4. The turret head unit as defined in claim 1 wherein said pin wheel includes a plurality of pins mounted on a rear end face thereof and equidistantly spaced apart on a circle whose center is the axis of rotation of said pin wheel, and an annular engaging groove formed on an outer periphery thereof.

5. The turret head unit as defined in claim 1 wherein said clamp member of said clamp means includes a horizontal arm having one end pivotally supported within said turret rest and the other end engaging said first auxiliary cam, and a clamp roller mounted on a medial portion of said horizontal arm and adapted to be pressed against said pin wheel.

6. The turret head unit as defined in claim 4 or 5 wherein said clamp roller is positioned in said annular engaging groove of said pin wheel with its axis extending radially of said pin wheel, so that when said horizonal arm is pivoted by said first auxiliary cam, said clamp roller is pressed against a side wall of said engaging groove of said pin wheel so as to restrain said pin wheel and thence said turret head against rotation.

7. The turret head unit as defined in claim 5 wherein said horizontal arm includes a connecting rod mounted thereon and extending at right angles thereto, said connecting rod being movably mounted on said horizontal arm for a predetermined distance in an axial direction thereof, a roller mounted on the distal end of said connecting rod and engaged by said first auxiliary cam, and a spring positioned between said horizontal arm and said connecting rod and adapted to urge said roller of said connecting rod against a side wall of said first auxiliary cam.

8. The turret head unit as defined in claim 1 wherein said cooperating member of said clutch operating means includes a pivotal arm engaged by said second auxiliary cam and an operating lever associated with said pivotal arm for engaging and disengaging said clutch.

9. The turret head unit as defined in claim 1 wherein said spindle drive shaft is disposed at a predetermined position in a radial direction of said turret head so that when said turret head is indexed, one of said tool receiving spindles is positioned on a line extending from the axis of rotation of said spindle drive shaft, and wherein said clutch includes a clutch cylinder adapted to be splined to said spindle drive shaft and said tool receiving spindle in the working position and slidable in an axial direction thereof, said clutch cylinder being operatively associated with said cooperating member of said clutch operating means, so that when said clutch cylinder is positioned over said spindle drive shaft and said tool receiving spindle in the working position, said clutch is brought to its operative position, and when said clutch cylinder is disengaged from said tool receiving spindle and moved toward said spindle drive shaft, said clutch cylinder is brought to its inoperative position.

* * * * *